US011722592B2

(12) United States Patent
Pinkos et al.

(10) Patent No.: US 11,722,592 B2
(45) Date of Patent: Aug. 8, 2023

(54) WEARABLE ANTENNA SYSTEM

(71) Applicant: Vorbeck Materials Corp., Jessup, MD (US)

(72) Inventors: Jennifer Pinkos, Hanover, MD (US); Keren Espina, Randallstown, MD (US); James A Turney, Silver Spring, MD (US); Sriram Manivannan, Baltimore, MD (US); Sandy Spence, Westminster, MD (US); Dan Scheffer, Scheffer, MD (US); John Lettow, Washington, DC (US)

( * ) Notice: Subject to any disclaimer, the term of this patent is extended or adjusted under 35 U.S.C. 154(b) by 0 days.

(21) Appl. No.: 17/591,559

(22) Filed: Feb. 2, 2022

(65) Prior Publication Data

US 2022/0256022 A1    Aug. 11, 2022

Related U.S. Application Data

(63) Continuation of application No. 16/925,581, filed on Jul. 10, 2020, now Pat. No. 11,265,410.
(Continued)

(51) Int. Cl.
*H01Q 1/36* (2006.01)
*H04B 1/3827* (2015.01)
(Continued)

(52) U.S. Cl.
CPC .............. *H04M 1/05* (2013.01); *A41D 1/002* (2013.01); *A41D 31/08* (2019.02); *H01Q 1/273* (2013.01);
(Continued)

(58) Field of Classification Search
CPC ......... H04M 1/05; A41D 1/002; A41D 31/08; H04W 84/04; H04W 84/18; H01Q 1/273; H01Q 1/36; H01Q 1/368; H01Q 1/27
See application file for complete search history.

(56) References Cited

U.S. PATENT DOCUMENTS

| 5,093,929 | A | * | 3/1992 | Stolarczyk | ........... | H04B 5/0081 455/100 |
| 5,146,611 | A | * | 9/1992 | Stolarczyk | ............... | H04B 5/02 455/40 |

(Continued)

*Primary Examiner* — Blane J Jackson
(74) *Attorney, Agent, or Firm* — Trent V. Bolar, Esq.

(57) ABSTRACT

Wearable antenna systems in the form of suspenders are disclosed. Such communications suspenders employ antenna elements having a reduced visual signature while maintaining the load bearing functionality of traditional suspenders. The antenna system communicatively couples to portable radios that operate on different RF frequencies via a communications hub. Some of the antennas elements are dynamically positionable (i.e., swappable, switchable, etc.) on the communications suspenders. A plurality of straps are pivotably coupled to an intermediate portion at one end and a demountable fastener at the other end. The demountable fasteners couple to the user's garment item (e.g., trousers, shorts, skirts, and similar articles). The straps include RF shielding material positioned to reflect RF radiation that emanates from the antenna elements away from the user. The antenna elements are formed using a conductive composition of fully exfoliated graphene sheets present as a percolated network in a polymer matrix.

17 Claims, 12 Drawing Sheets

Related U.S. Application Data

(60) Provisional application No. 63/144,590, filed on Feb. 2, 2021, provisional application No. 63/013,599, filed on Apr. 22, 2020.

(51) Int. Cl.

| | | |
|---|---|---|
| *H01Q 1/27* | (2006.01) | |
| *A41D 1/00* | (2018.01) | |
| *H04M 1/05* | (2006.01) | |
| *A41D 31/08* | (2019.01) | |
| H04W 84/04 | (2009.01) | |
| H04W 84/18 | (2009.01) | |

(52) U.S. Cl.
CPC ............ *H01Q 1/368* (2013.01); *H04B 1/385* (2013.01); *H04B 2001/3855* (2013.01); *H04W 84/04* (2013.01); *H04W 84/18* (2013.01)

(56) References Cited

U.S. PATENT DOCUMENTS

| | | |
|---|---|---|
| 7,658,901 B2 | 2/2010 | Prud'Homme et al. |
| 8,278,757 B2 | 10/2012 | Crain et al. |
| 11,265,410 B2 * | 3/2022 | Scheffer ................. A41D 31/08 |
| 2002/0089458 A1 * | 7/2002 | Allen .................... H01Q 9/0421 |
| | | 343/718 |
| 2020/0002560 A1 * | 1/2020 | Lai ........................ C09D 11/037 |

* cited by examiner

WEARABLE ANTENNA SYSTEM

CROSS-REFERENCE TO RELATED APPLICATIONS

This application claims priority to U.S. Provisional Application Ser. No. 63/144,590, filed Feb. 2, 2021, which is a continuation of U.S. patent application Ser. No. 16/798,712, filed Feb. 24, 2020, which claims priority to U.S. Provisional Application Ser. No. 62/861,974 filed Jun. 14, 2019. This application is also a continuation of U.S. patent application Ser. No. 16/925,581 filed Jul. 10, 2020, which claims priority to U.S. Provisional Application Ser. No. 63/013,599 filed Apr. 22, 2020. Each of the foregoing applications are hereby incorporated herein by reference.

TECHNICAL FIELD

Background

The instant disclosure relates generally to antenna systems and specifically to wearable antenna systems. Handheld (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments. Therefore, a communications solution that does not utilize whip antennas will be beneficial to consumers.

DETAILED DESCRIPTION

Figure 1:
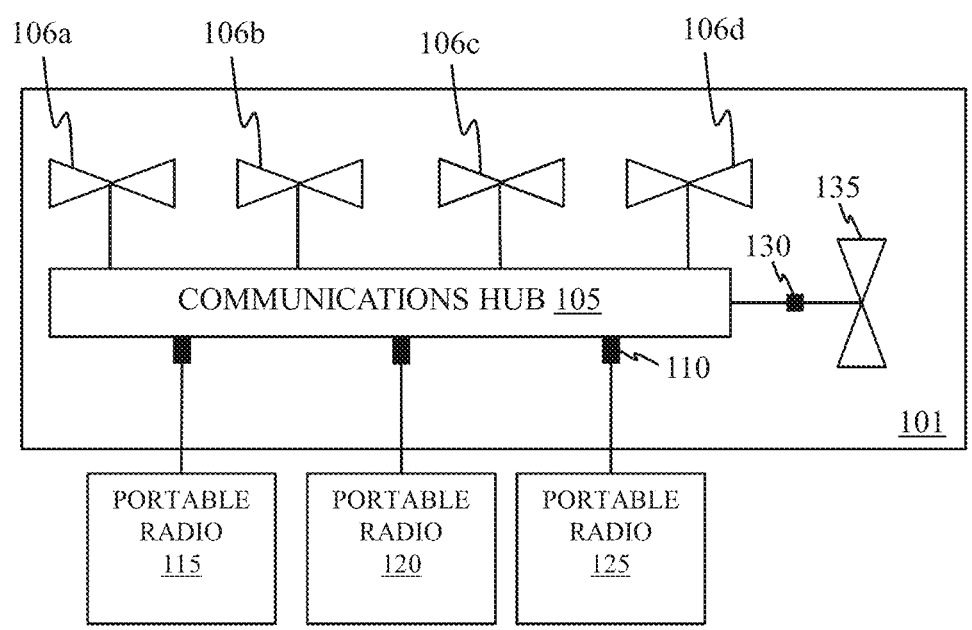
FIG. 1 is a block diagram illustrating a communications suspenders, in accordance with some embodiments.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. The terms "an" and "a" refer to at least one of a component, element, object, etc. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Hand-held (i.e. portable) communications systems, such as walkie-talkies and other portable radio transceivers (hereinafter "portable radios"), are typically used by military personnel, law enforcement officials, first responders, as well as civilians. However, such systems typically utilize one or more conspicuous antennas, such as whip antennas, which typically consist of a straight flexible metal wire or rod. The bottom end of whip antennas are communicatively coupled to the transceiver. Whip antennas are typically designed to be flexible to reduce breaking since such antennas are typically vulnerable to entanglement in foliage or debris, and damage in disaster and emergency, as well as high population density environments. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments.

Embodiments of the instant disclosure seek to provide wearable antenna systems in the form of suspenders (hereinafter "communications suspenders"). Such communications suspenders employ antenna elements that display a reduced visual signature while maintaining the load bearing functionality of traditional suspenders known in the art. Suspenders are apparel accessories that are designed to hold up apparel items that are worn on the lower extremities (e.g., pants, or trousers). Suspenders typically include a set of straps that go over the shoulders and attach to apparel item with buttons, clips, clasps, and/or similar demountable fasteners. The pants are literally suspended from these straps, which explains the origin of the name. In other words, suspenders are load bearing apparel item accessories.

The embedded antenna system can communicatively couple to one or more portable radios that each operate on a different RF frequency. Additional aspects of the instant disclosure seek to provide communications suspenders that include modular antennas elements that are dynamically positionable (i.e., swappable, switchable, etc.) thereon.

FIG. 1 is a block diagram illustrating a communications suspenders 101, in accordance with some embodiments. To be sure, the communications suspenders 101 can be structurally and functionally similar to suspenders known in the art (i.e., fabric, composite, and/or leather straps worn over the shoulders to hold up skirts, trousers, shorts, and similar articles). Straps of the communications suspenders 101 may be elasticated, either entirely or only at attachment ends, and can form an "H" (i.e., four attachment ends), "X" (i.e., four attachment ends) "Y" (i.e., three attachment ends), or "U" (i.e., two attachment ends) shape at the back. The communication suspender 101 includes a communications hub 105 and antenna elements 106 conductively coupled thereto. The antenna element 106 can include an antenna array. Although depicted as having four (4) antenna elements 106 (i.e., antenna elements 106a, 106b, 106c, and 106d, the communications suspenders can include any number of antenna elements to satisfy one or more embodiments of the instant disclosure. At least one of the antenna elements 106a, 106b, 106c, and 106d preferably operates on a RF frequency that is unique compared to others of the aforementioned group. The communications hub 105 includes one or more antenna ports 110 that each demountably couples to a portable radio (e.g., a portable radio 115, 120, or 125) at one end and conductively couples to one of the antenna elements 106 or antenna attachment site 130 at the opposite end. To be sure, the communications hub 105 can include any number of the antenna ports 110 to satisfy one or more embodiments of the instant disclosure.

Figure 6:
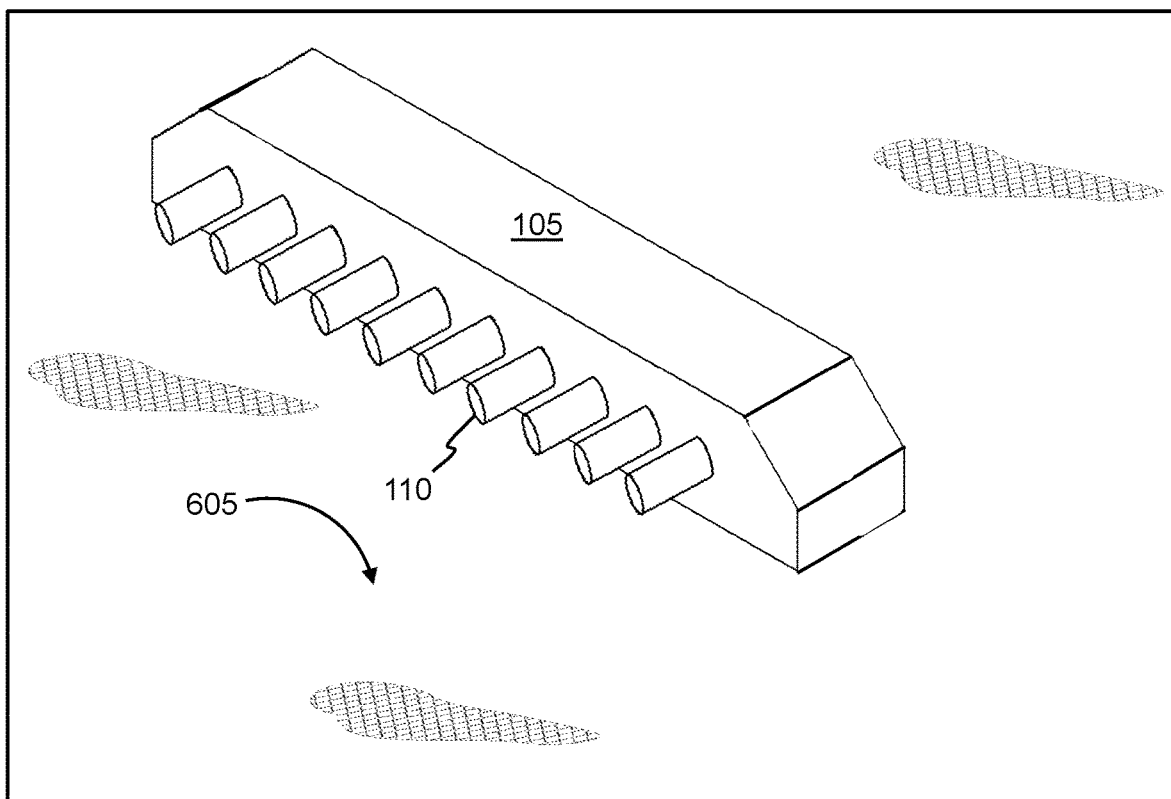
FIG. 6 is a line drawing of the communications hub coupled to a strap, in accordance with yet still other embodiments.

The communications hub 105 is the central location where portable radios (e.g., portable radios 115, 120, and 125) or other similar communications devices conductively couple to the antenna elements 106. In other words, the communications hub 105 acts as a RF bulkhead. The communications hub 105 can be fabricated using any material that supports one or more embodiments described herein (e.g., metals and/or plastics) and can include any number of the antenna ports 110 to satisfy an embodiment of the instant disclosure. FIG. 6 is a line drawing of the communications hub 110 coupled to a surface 605 (e.g., the first strap 205, the second strap 210, the third strap 215, or the intermediate portion 220), in accordance with yet still other embodiments. The antenna ports 110 can include a fastening mechanism known in the art (e.g., thread, bayonet, braces, blind mate, etc.) and springs for a low ohmic electric contact while sparing the conductive surface, thus allowing very high mating cycles, and reducing the insertion force. Each of the antenna ports 110 is conductively coupled to at least one of the antenna elements 106 and thereby allows the portable radio (i.e., the portable radios 115, 120, and/or 125) to communicate via the antenna element.

Figure 4A:
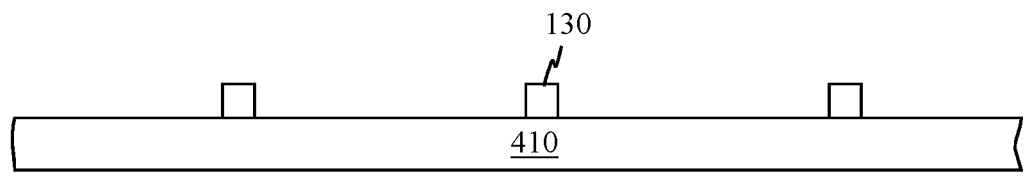
FIG. 4A depict a side view of a universal strap and an antenna attachment site, according to yet still other embodiments.

Additional antenna elements 106 are attached to the communications suspenders 101 to change the RF radiation pattern thereof, according to other embodiments. For example, the antenna elements 106 having a first operational frequency (e.g., frequency A) can be exchanged with other antenna elements 106 having a second operational frequency (e.g., frequency B). The fungibility of the antenna elements 106 allows the communications suspenders 101 to generate or alter the RF frequency coverage and RF radiation patterns thereof to meet individual needs, inclinations, and/or specifications. In addition, the quantity of the antenna elements 106 included in the communications suspenders 101 can be varied according to user requirements. As depicted in FIG. 4A, the communications suspenders 101 includes at least one antenna attachment site 130 which receives a demountable antenna element 135. For example, at least one of the first strap 205, the second strap 210, the third strap 215, and the intermediate portion 220 can include an antenna attachment site 130. The demountable antenna elements 135 preferably "snap" on to the antenna attachment sites 130 (i.e., are demountably attached thereto).

In other words, the demountable antenna elements 135 and the antenna attachment sites 130 demountably couple together when shifted in a common plane, which thereby forms a selective, intermitting, and conductive coupling therebetween. The antenna ports 110 can be any RF connector known in the art that supports one or more embodiments of the instant disclosure (e.g., SMA QMA, BNC, etc.). One or more of the communications device 115, 120, and 125 can be a plurality of devices interoperably connected to perform one or more functions, steps, and/or processes of a portable radio known in the art. In several embodiments, the communications devices 115, 120, and/or 125 send and/or receive data modulated via one or more communications protocols known in the art. For example, applicable communication protocols can include, but are not limited to, UHF, VHF, Long-Term Evolution ("LTE"), 3G, standards based on GSM/EDGE and/or UMTS/HSPA, Wi-Fi, IEEE 802.11 standards, GPSR, local area networking protocols, wide area networking protocols, Bluetooth, microwave, similar wireless communications protocols, or a combination of two or more thereof.

In preferred embodiments, the antenna elements 106 and the demountable antenna elements 135 are applied (e.g., screen printing, coating, similar application methods) on a substrate (e.g., polyethylene terephthalate and similar materials) using a graphene polymer-based composition ("conductive composition") wherein individual fully exfoliated sheets of graphene ("graphene sheets") are mixed and disbursed throughout a polymer matrix. In some embodiments, the antenna elements 106 are applied (e.g., printed) on a surface of the communications suspenders 101, which acts the substrate. The graphene sheets are approximately 1 nm or less thick and have a "platey" (e.g., two-dimensional) structure. To be sure, although graphene sheets, graphite, and carbon nanotubes are allotropes of carbon, they are not identical in structure or composition and each exhibits mutually exclusive properties.

The conductive composition preferably includes one or more polymers and fully exfoliated single sheets of graphene that form a three dimensional percolated network within the polymer matrix and have nanoscale separation between the individual graphene sheets. In other embodiments, the antenna elements are printed using other polymer-based conductive inks that contain metals (e.g., silver, copper, gold, nickel, other metals, or a combination of two or more thereof). An increase in resistance results in a decrease in antenna element performance efficiency. As used herein, "antenna efficiency" is defined as the ratio of power delivered to antenna elements versus the power radiated therefrom. Hence, an increase in electrical resistance decreases the amount of power available for radiation, which thereby decreases antenna element performance efficiency.

The antenna elements 106 and the demountable antenna elements 135 each have a reduced visual signature (e.g., less than 2 mm thick) to address identification and entanglement issues associated with traditional antenna elements (e.g., whip antennas). Here, the aforementioned antenna elements extend no more than 2 mm from the surface of the WCP 100 and thereby provides a reduced probability of entanglement with external structures. In other embodiments, the aforementioned antenna elements exhibit a gain greater than 0 dB. The aforementioned antenna element are preferably positioned at various locations on the communications suspenders 101 to achieve an omnidirectional RF radiation pattern that whip antennas known in the art cannot achieve. As depicted in FIG. 4C, a transmission line 445 can be embedded in the communications suspenders 101 in a manner that reduces its ability to interfere with user movements. For example, the transmission lines 445 can be embedded between two substrate layers inaccessible to the user. The transmission line 445 is preferably flexible to substantially conform to the contours of the user. The transmission line 445 can be fabricated using the conductive composition.

Figure 4B:
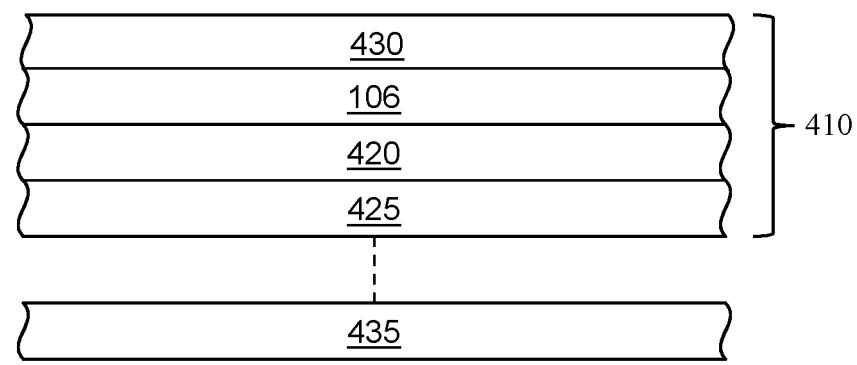
FIG. 4B depicts a side cut through view of the universal strap of FIG. 4A having RF shielding material positioned proximate to an antenna element and a user's surface positioned proximate to the RF shielding material, according to some embodiments.
Figure 4C:
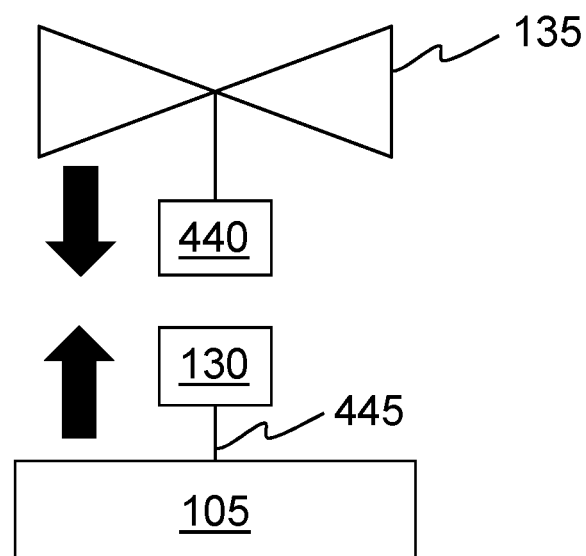
FIG. 4C depicts a pairing element demountably engaging an antenna attachment site, in accordance with other embodiments.
Figure 5:
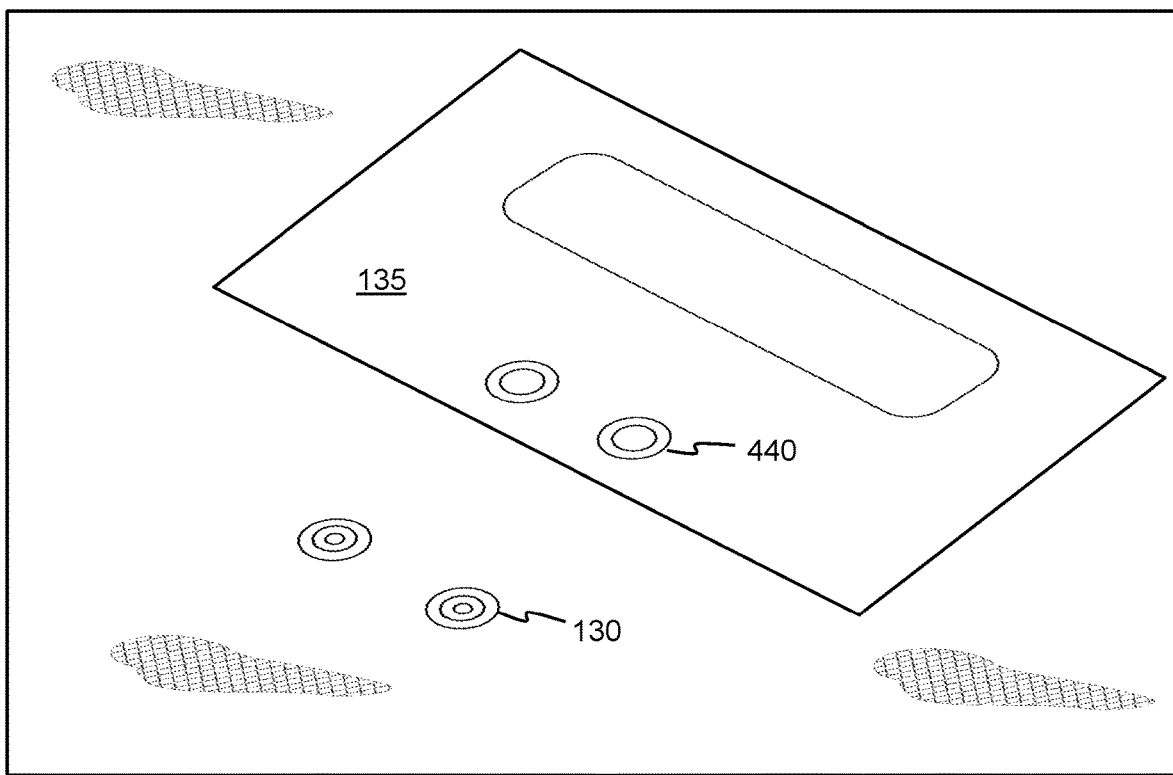
FIG. 5 is a line drawing of an antenna attachment site and an antenna element that demountably couples to the antenna attachment site, in accordance with certain embodiments.

FIG. 4C depicts a pairing element 440 complementarily and demountably mating with the antenna attachment site 130, in accordance with some embodiments. The demountable antenna element 135 includes and is conductively coupled to the pairing element 440. The pairing element 440 and the antenna attachment site 130 are complementing components of a mating system (i.e., they complementarily mate together when joined). The pairing element 440 complementarily and demountably mates with the antenna attachment site 135 when the two are brought together and thereby form the aforementioned mating system. FIG. 5 is a line drawing of an antenna attachment site 130 affixed to a surface and an antenna element 135 that demountably couples to the antenna attachment site 130 via the pairing element 440, in accordance with certain embodiments. When coupled together, the pairing element 440 and the antenna attachment site 130 facilitate RF wave propagation between the communications hub 105 and the demountable antenna element 135.

The communications hub 105, via the antenna port 110, is conductively coupled to each antenna attachment site 130 via a transmission line 445. The transmission line 445, for example, may be affixed to one or more internal and/or external surfaces of the communications suspenders 101. In other aspects, the pairing element 440 and the antenna attachment site 130 demountably engage each other when shifted in a common plane, which thereby forms a selective, intermitting, and conductive coupling therebetween. In still other aspects, the pairing element 440 and the antenna attachment site 130 form a conductive hook-and-loop mating system when engaged. For example, the individual hooks and loops can be formed using the conductive composition and applicable formation techniques known in the art. Similar to suspenders known in the art, the communications suspenders 101 are configured to be worn over shoulders in a manner that results in the article having weight bearing characteristics.

Figure 2:
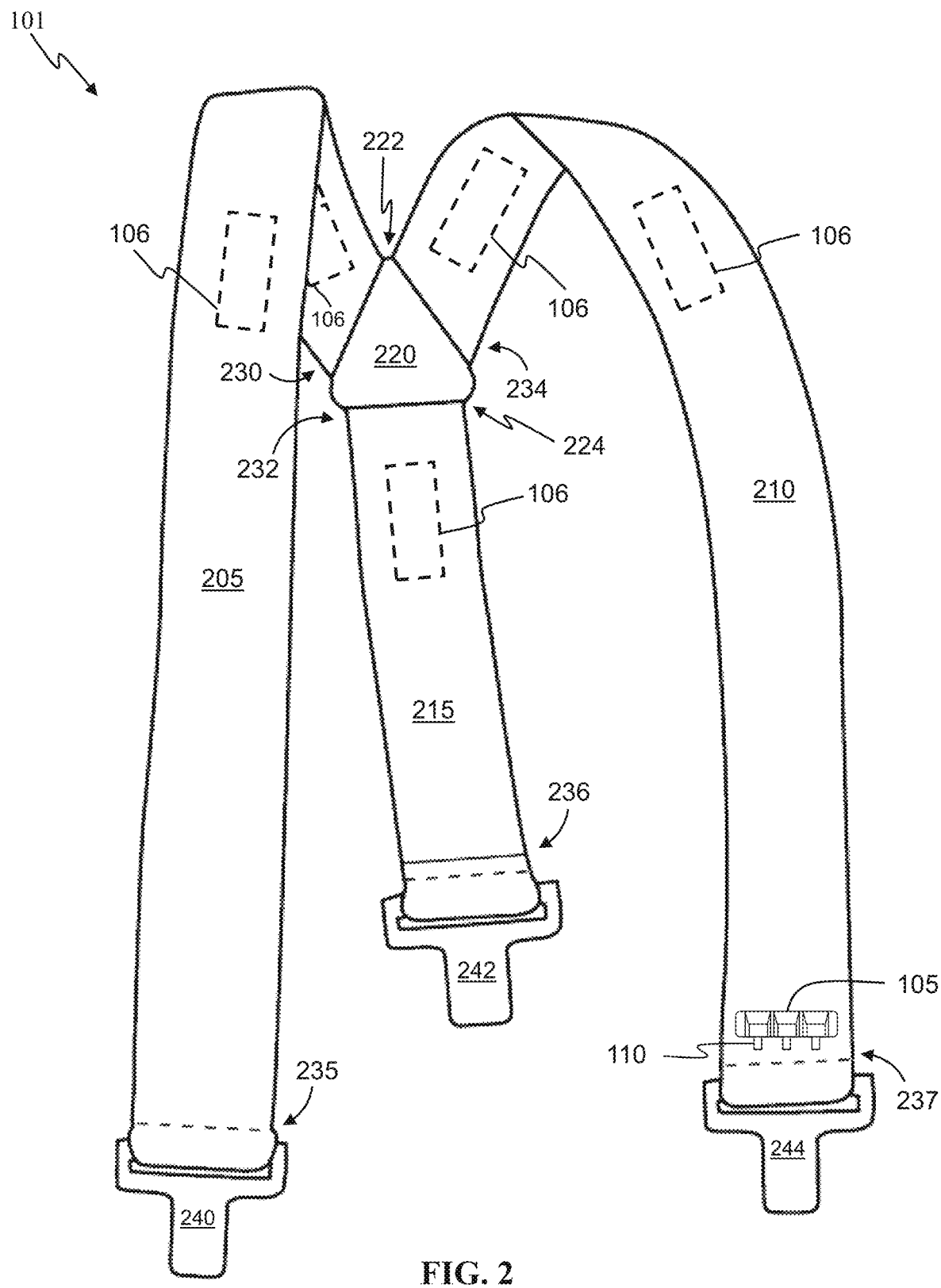
FIG. 2 illustrates a front view of a three-strap version of the communications suspenders, in accordance with other embodiments.

FIG. 2 illustrates a front view of a three-strap version of the communications suspenders, in accordance with other embodiments. In other words, FIG. 2 depicts the communications suspenders 101 in a "Y" configuration (discussed above). The communications suspenders 101 include a first strap 205, a second strap 210, a third strap 215, and an intermediate portion 220. The intermediate portion 220 includes a top end 222 and a bottom end 224. The intermediate portion 220 binds the first strap 205, the second strap 210, and the third strap 215 together, which helps to keep them on top of the shoulders. Each of the first strap 205, the second strap 210, and the third strap 215 include a first end 230, 232, and 234, respectively. At the opposing end, each of the first strap 205, the second strap 210, and the third strap 215 include a second end 235, 237, and 236, respectively. Here, the first strap 205 and the second strap 210 form the upper arms of the "Y" configuration and the third strap 215 for the lower arm.

Figure 3:
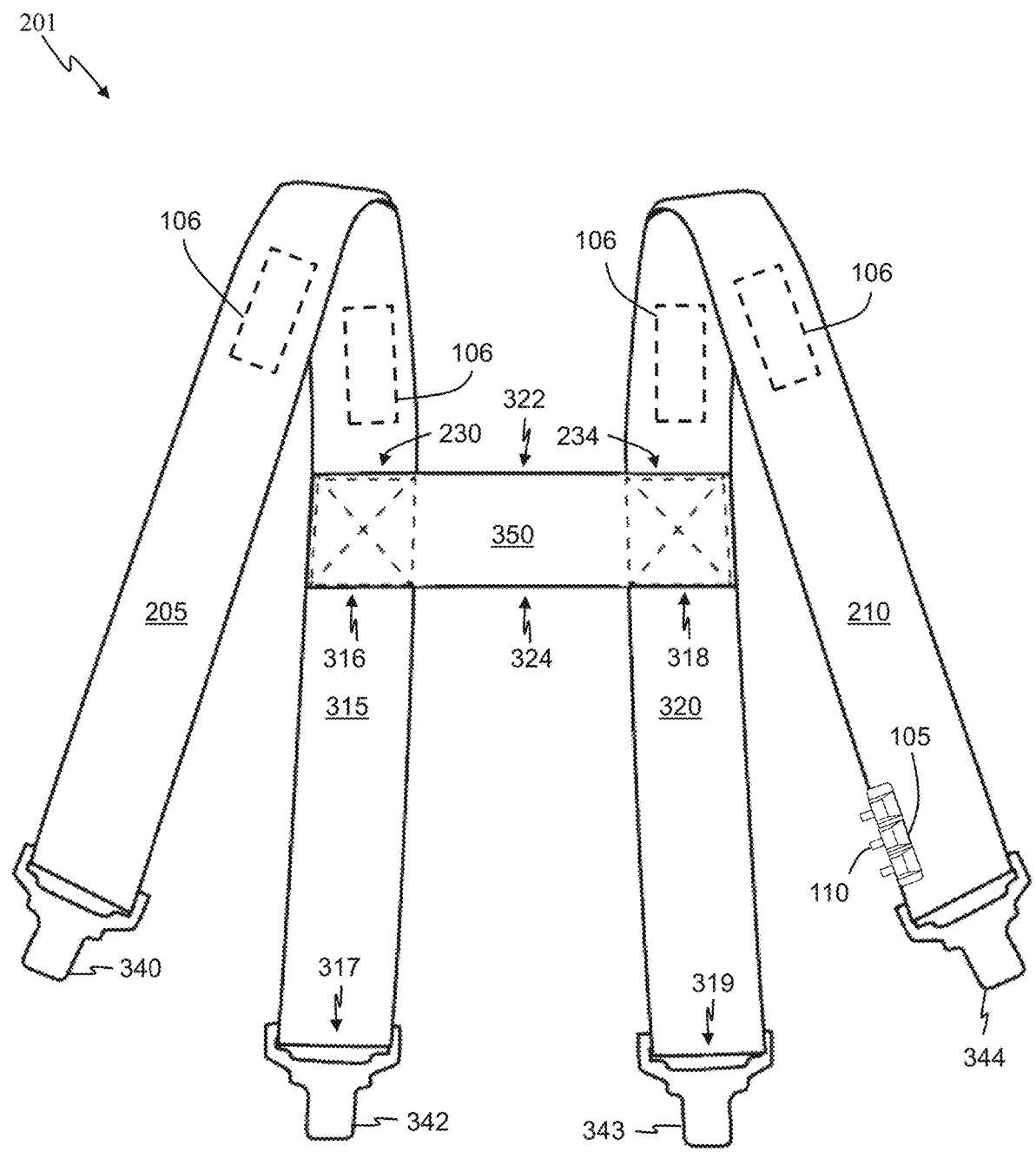
FIG. 3 illustrates a front view of four-strap version of the communications suspenders, in accordance with certain embodiments.

For example, the first end 230 is coupled to the top end 222 and the first end 234 is coupled to the top end 222 proximate to the first end 230. Alternatively, the communications suspenders 101 can be configured in the "H" configuration. For example, FIG. 3 depicts a communications suspenders 201 that functions similarly to and shares components with the communications suspenders 101. Here, the first strap 205 and the second strap 210 are pivotably coupled to top end 322 of the intermediate portion 350 and thereby form the upper arms of the "H" structure and the third strap 316 and the third strap 318 are pivotably coupled for the bottom end 324 of the intermediate portion 350 and thereby form the lower arms of the "H" structure. Although depicted with a rectangular structure, the intermediate portion 350 can be any shape that satisfies an embodiment of the instant disclosure.

The intermediate portion 350 shares one or more qualities, functionalities, and components with the intermediate portion 220. The third strap 316 and the third strap 318 shares one or more qualities, functionalities, and components with the third strap 215. To be sure, in other embodiments, third straps form a single unit with first straps and/or second straps. The communications suspenders of the instant disclosure utilize two copies of the third strap to form the "X" configuration (not shown). To assume a "U" structure, two third straps are utilized wherein their second ends are each coupled a second end of the first strap or the second strap. As a result, only the demountable fasteners of the first strap and the second strap are demountably coupled to garment item At least one of the first strap 205, the second strap 210, the third strap 215, and the intermediate portion 220 can include at least one of the antenna element 106 affixed thereto. The first strap 205 or the second strap 210 preferably include the communications hub 105 affixed thereto. As previously discussed, the communications hub 105 includes at least one antenna port 110. The second ends 235, 236, and 237 each include a demountable fastener. Applicable demountable fasteners, include, but are not limited to, buttons, clips, and clasps.

The communications suspenders 101 are configured to be worn on the shoulders and thereby perform load bearing functions and support garment items (e.g., trousers, skirts, and similar garments) worn on the lower part of the body via the demountable fasteners that each demountably couple to the garment item. At least one of the first strap 205, the second strap 210, the third strap 215, and the intermediate portion 215 include an antenna attachment site 135. At least one of the first strap 205, the second strap 210, and the third strap 215 is a multilayered component. FIG. 4A depict a side view of a universal strap 410 and an antenna attachment site 130, according to yet still other embodiments. The universal strap 410 is a multi-layered component used here to represent one or more of the first strap 205, the second strap 210, and the third strap 215, according to certain embodiments. In some aspects, the intermediate portion 215 is a multi-layered component that has a configuration similar to the universal strap 410.

FIG. 4B depicts a side cut through view of the universal strap 410 that includes RF shielding material 420 positioned proximate to the antenna element 106 and a user surface 435 (i.e., user's skin or epithelial layer) positioned proximate to the RF shielding material 420, according to some embodiments. In other words, the RF shielding material 420 is positioned between the antenna element 106 (or the demountable antenna element 135) and the user surface 435. The RF shielding material 420 and the antenna element 106 are preferably positioned between fabric layers 430 and fabric layer 425, which is positioned proximate to the user surface 435. The RF shielding material 420 is positioned proximate to (i.e. beneath) the antenna element 106 (or the antenna attachment site 130) to reflect RF radiation that emanates from the antenna element 106 (or the antenna attachment site 135) away from the fabric layer 425 and the user surface 435.

The RF shielding material 420 includes one or more of a textile, a mesh, a coating, and a foam. Applicable RF shielding material includes, but is not limited to, RF shielding meshes, coatings, textiles, and foams (e.g., quarter inch closed-cell polypropylene foam). For example, the RF shielding material 420 can also be lined with and/or include conductive material, such as aluminum or copper foil, or material coated with (or combined with) graphene, silver, copper, or conductive inks, to provide additional RF isolation and RF shielding from the user surface 435 to reduce the specific absorption rate of the communications suspenders 101. In preferred embodiments, the RF shielding material 420 has a thickness that physically separates antenna elements 106 (or the antenna attachment site 135) from user's body to reduce RF interference and improve signal quality. Although not shown, the multilayered component 410 can include additional or less layers that those depicted. For example, components of the communications suspenders 101 that have antenna attachment sites 130 can also include the RF shielding layer 420 positioned thereunder and proximate thereto throughout at least a portion of the universal strap 410. Even if the antenna element 106 or the antenna attachment site 130 is not present in a component of the communications suspenders 101, the universal strap 410 can include the RF shielding layer 420 to provide additional RF shielding.

Figure 7:
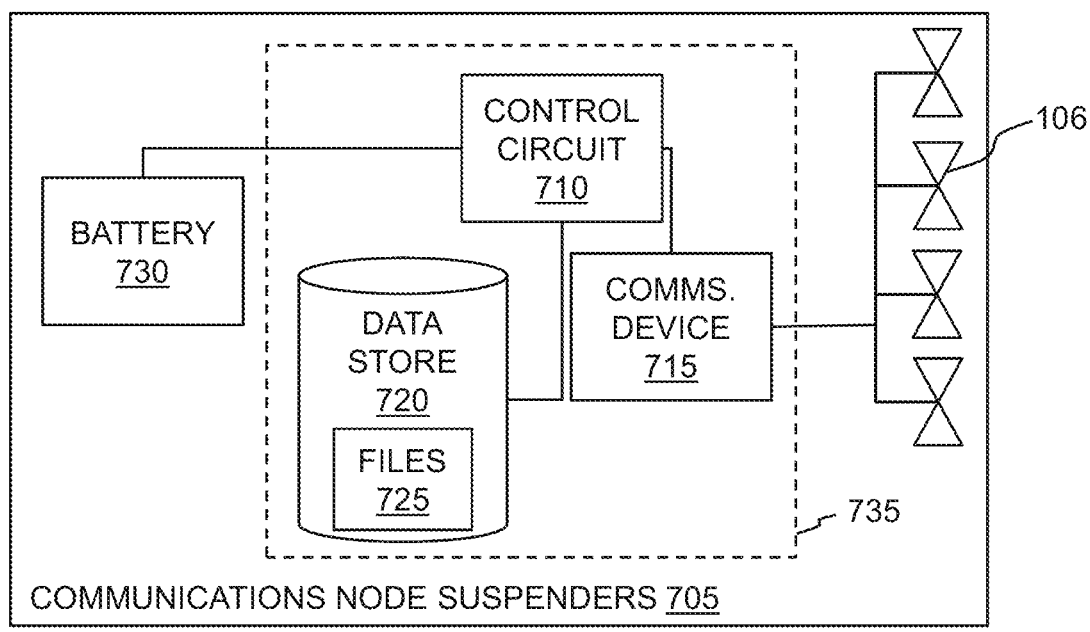
FIG. 7 is a block diagram illustrating a communications node suspenders, in accordance with some embodiments.

In certain embodiments, the communications suspenders 101 is configured to be a network node or element (e.g., a mesh network node). FIG. 7 is a block diagram illustrating a communications node suspenders 705, in accordance with some embodiments. The network node suspenders 705 utilizes the low profile antenna elements 106 to reduce its visual signature similar to communications suspenders 101. Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

Figure 8:
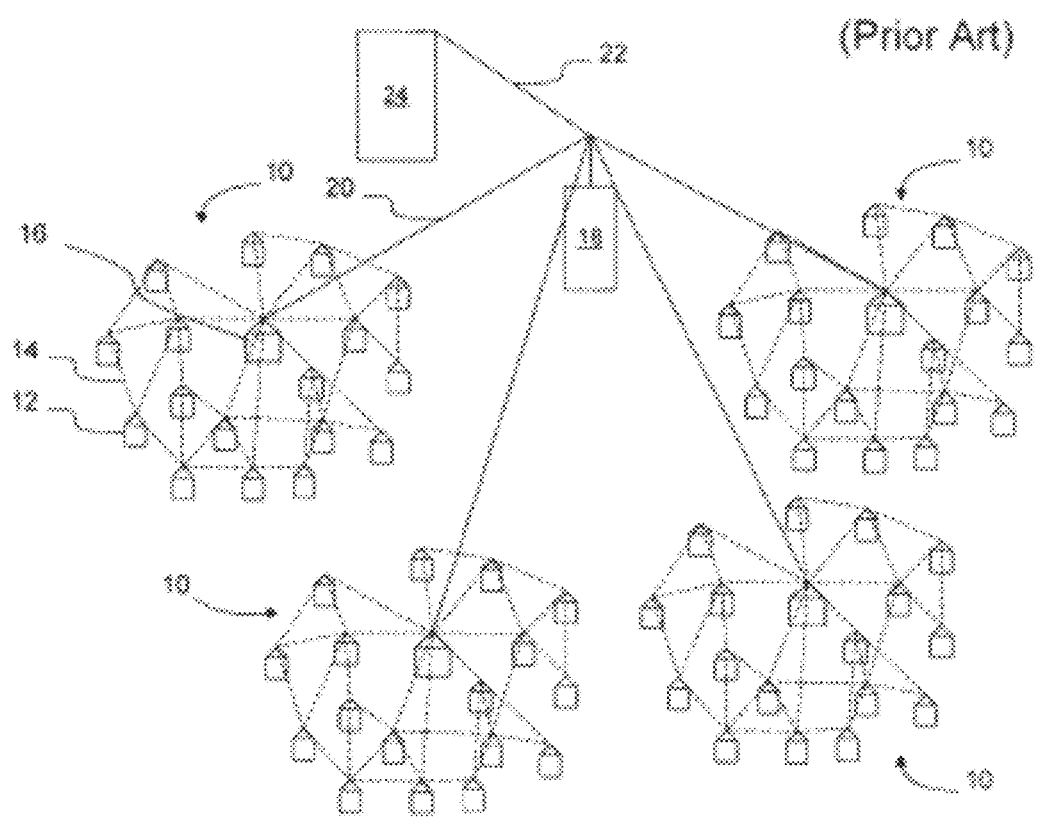
FIG. 8 is prior art that depicts a conventional arrangement of wireless mesh communications network.

An example of a conventional arrangement of wireless meshes is shown in FIG. 8. Another example of a wireless mesh network is given in US Patent application publication no. US 2002/0159409 A1, the content of which is hereby incorporated herein by reference. In the example illustrated in FIG. 8, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 8, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 8, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

The communications node suspender 705 includes a primary component 735 and is powered by a battery 730 (e.g., a primary or secondary battery). The primary component 735 includes a communications device 715 and a data store 720 interconnected via at least one control circuit 710. To be sure, the control circuit 710 is configured to perform one or more steps, functions, processes of the instant disclosure. The data store 720 is a repository for persistently storing (e.g., in the files 725) and managing collections of data. The data store 720 includes instructions to perform one or more functions, steps, or processes of the instant disclosure. The communications device 715 is communicatively coupled to and preferably communicates via one or more antenna elements 106 (e.g., send and/or receive data modulated via one or more communications protocols known in the art). For example, the communications device 135 can communicate via one or more communication protocols known in the art that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth °, microwave, and similar wireless communications protocols.

Figure 9:
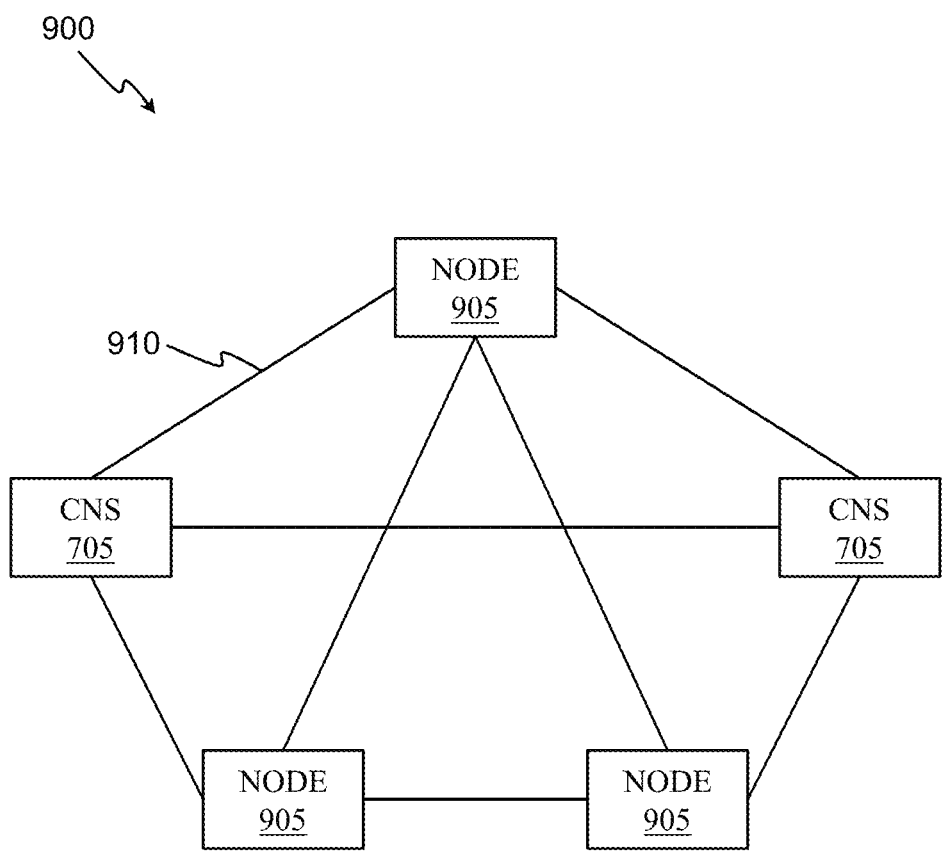
FIG. 9 depicts a block diagram of a mesh communications network, in accordance with other embodiments.

In certain embodiments, the communications device 715 operates on several unique radio frequency ranges. For example, the communications device 715 may be configured to operate on the VHF (i.e. 30-300 MHz) and UHF (i.e. 300 MHz to 3 GHz) radio frequency bands and thereby facilitate multi-band/broadband functionality (discuss further below). The communications device 715 can preferably establish a wireless mesh network with other mesh networked communications devices (e.g., a communications node suspenders 705 and/or a mesh network nodes 905). FIG. 9 depicts a block diagram of a mesh network communications environment, generally 900, that includes the communications node suspenders 705 and the nodes 905, according to some embodiments. As used herein the term "mesh network" refers to a local network topology in which the infrastructure nodes connect directly, dynamically and non-hierarchically to as many other nodes as possible and cooperate with one another to efficiently route data from/to clients.

One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

Network elements can be used to form a wireless mesh network. One characteristic of a mesh network is that in a mesh network there are generally multiple paths through the network that a given user may employ to reach the access point. By allowing traffic to hop from user to user (i.e. from node to node), instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

Figure 10:
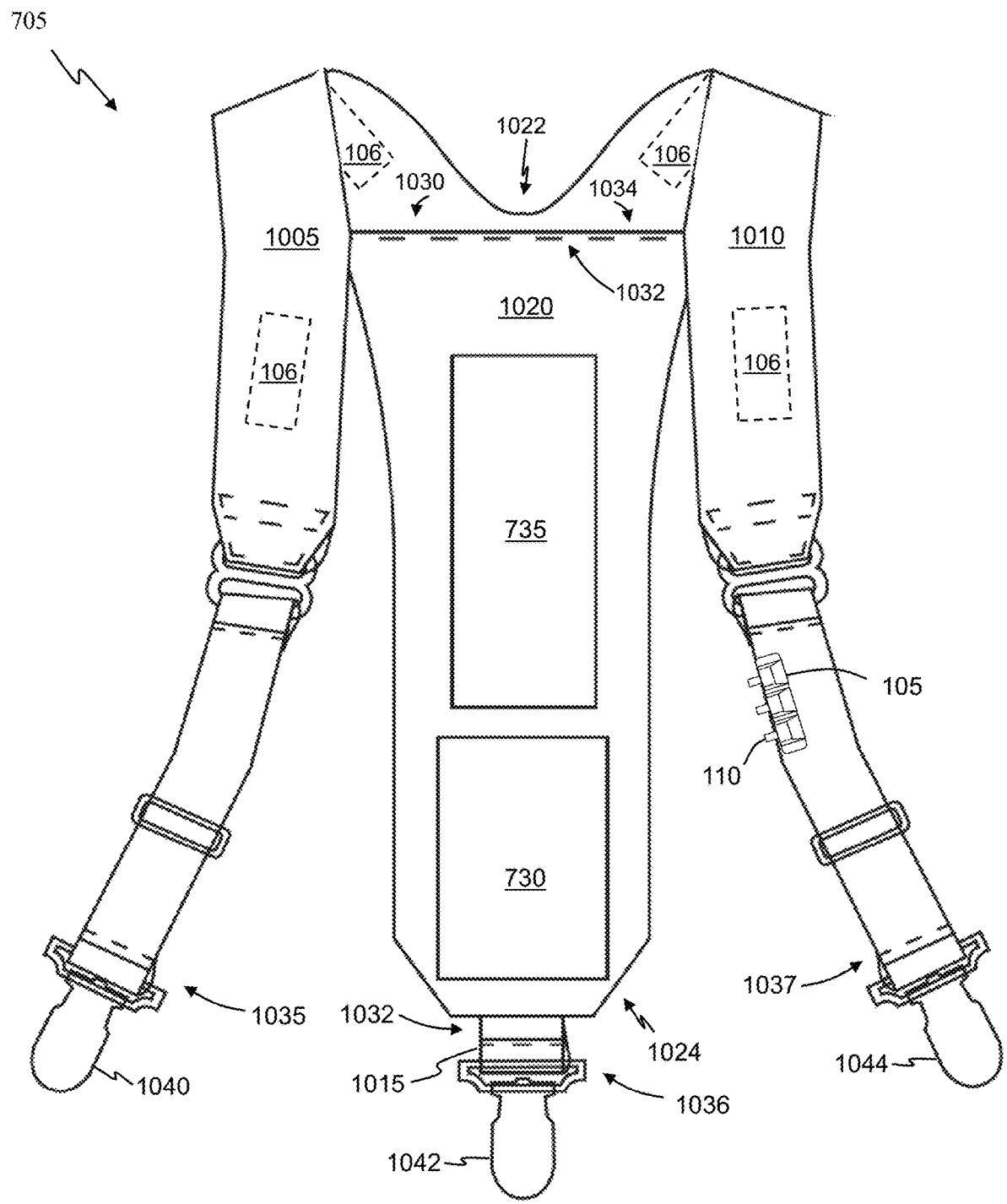
FIG. 10 illustrates a front view of the communications node suspenders, in accordance with certain embodiments.
Figure 11:
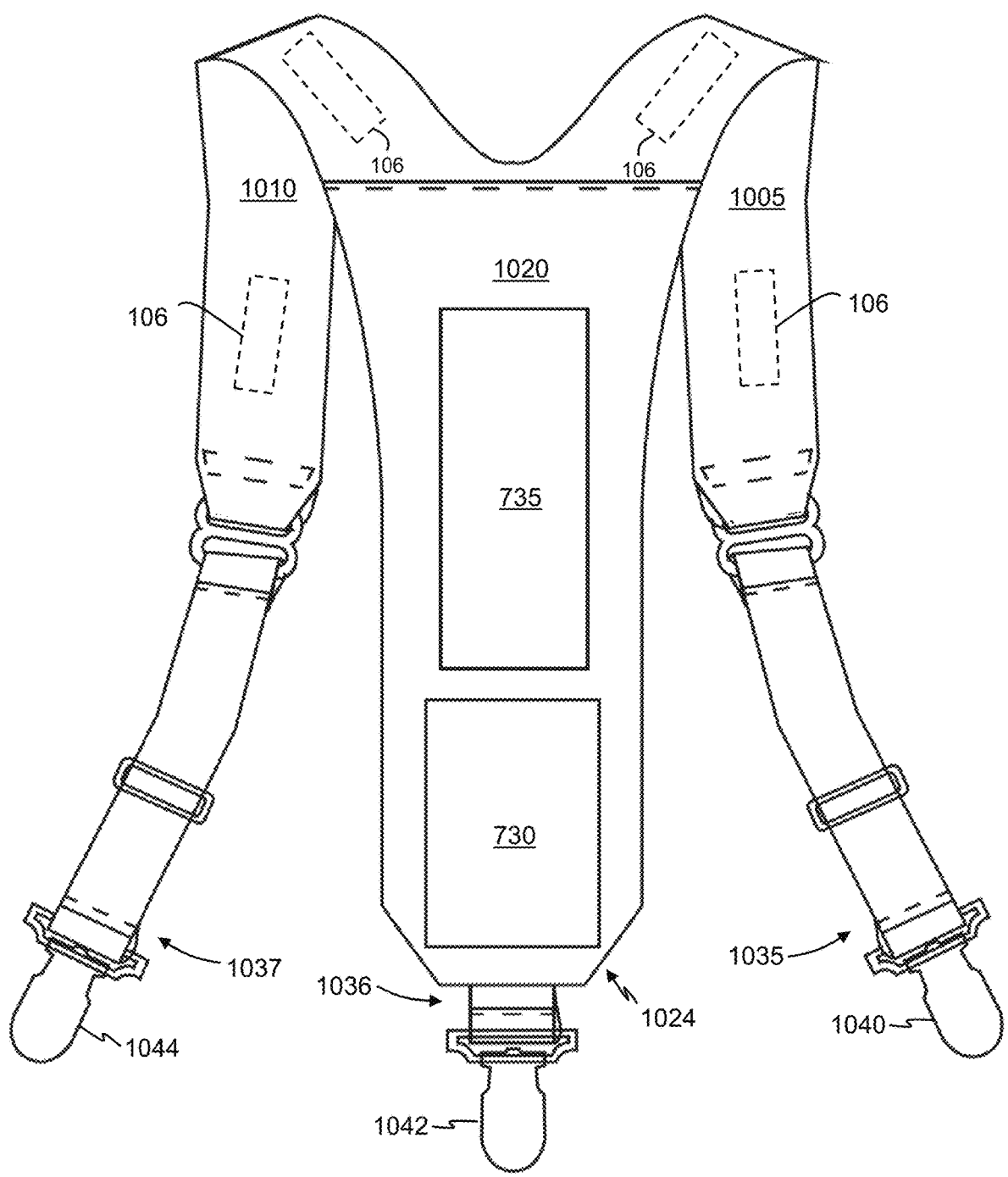
FIG. 11 illustrates a back view of the communications node suspenders of FIG. 10, in accordance with certain embodiments.

FIGS. 10 and 11 illustrates a front view and a back view, respectively, of the communications node suspenders 705, in accordance with certain embodiments. Although the communications node suspenders 705 are depicted in the aforementioned "Y" configuration, the "X" or the "H" configuration can also be utilized. To be sure, the communications node suspenders 705 and the communications suspenders 101 may share one or more components, functionalities, and or configurations. The communications node suspenders 705 includes a first strap 1005, a second strap 1010, and a third strap 1015 all pivotably coupled to an intermediate portion 1020. Embodiments that utilize the "X" or "H" configuration utilize two copies of the third strap 1015. Each of the first strap 1005, the second strap 1010, and the third strap 1015 include a first end 1030, 1034, and 1032, respectively. At the opposing end, each of the first strap 1005, the second strap 1010, and the third strap 1015 include a second end 1035, 1037, and 1036, respectively. Here, the first strap 1005 and the second strap 1010 form the upper arms of the "Y" configuration and the third strap 1015 forms the lower arm. For example, the first end 1030 is coupled to the top end 1022 and the first end 1034 is coupled to the top end 1022 proximate to the first end 1030. At least one of the first strap 1005, the second strap 1010, the third strap 1015, and the intermediate portion 1020 can include at least one of the antenna element 106 affixed thereto. In some embodiments, the first strap 1005 or the second strap 1010 preferably include the communications hub 105 affixed thereto in a manner that at least partially exposes the antenna ports 110, which are each conductively coupled to an antenna element 106 or an antenna attachment site 130 that is not conductively coupled to the communications device 715. Such a configuration allows users to communicate using two or more different sets of antenna elements simultaneously. The second ends 1035, 1037, and 1036 each include a demountable fastener 1040, 1044, and 1042, respectively. Applicable demountable fasteners, include, but are not limited to, buttons, clips, and clasps. To be sure, first strap 1005, the second strap 1010, the third strap 1015 can be functionally and/or structurally similar to the first strap 205, the second strap 210, and the third strap 215, respectively.

Figure 12:
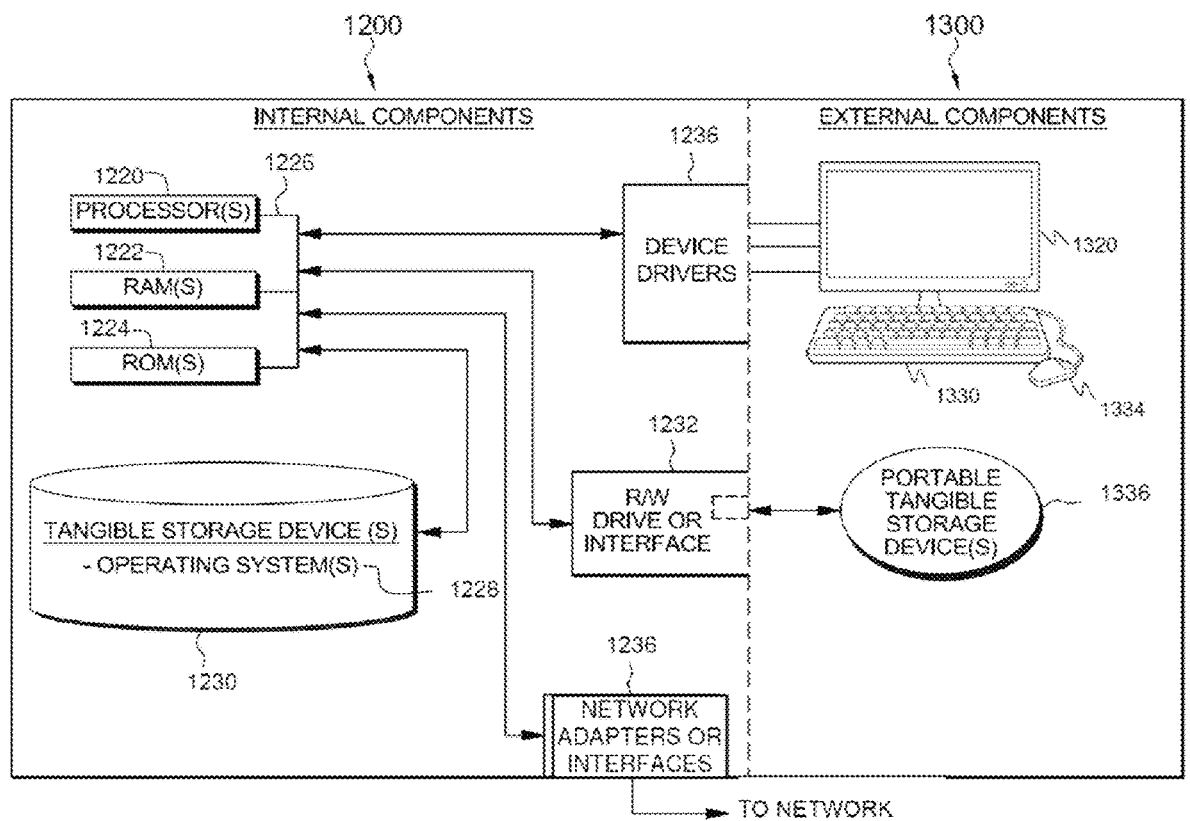
FIG. 12 depicts a block diagram of components of a computing device, in accordance with yet still other embodiments.

FIG. 12 depicts a block diagram of components of communications node suspenders 705, in accordance with an embodiment of the present invention. Data processing system 1200, 1300 is representative of any electronic device capable of executing machine-readable program instructions. Data processing system 1200, 1300 may be representative of a smart phone, a computer system, PDA, or other electronic devices. Examples of computing systems, environments, and/or configurations that may represented by data processing system 1200, 1300 include, but are not limited to, personal computer systems, server computer systems, thin clients, thick clients, wearable computer, handheld or laptop devices, multiprocessor systems, microprocessor-based systems, network PCs, minicomputer systems, and distributed cloud computing environments that include any of the above systems or devices.

The communications node suspenders 705 includes respective sets of internal components 1200 and external components 1300 as illustrated in FIG. 12. Each of the sets of internal components 1200 includes one or more processors 1220, one or more computer-readable RAMs 1222 and one or more computer-readable ROMs 1224 on one or more buses 1226, and one or more operating systems 1228 and one or more computer-readable tangible storage devices 1230. Files 725 are stored on one or more of the respective computer-readable tangible storage devices 1230 for execution by one or more of processors 1220 via one or more of the respective RAMs 1222 (which typically include cache memory). In the embodiment illustrated in FIG. 12, each of the computer-readable tangible storage devices 1230 is a magnetic disk storage device of an internal hard drive. Alternatively, each of the computer-readable tangible storage devices 1230 is a semiconductor storage device, such as ROM 1224, EPROM, flash memory or any other computer-readable tangible storage device that can store a computer program and digital information.

Internal components 1200 also include a R/W drive or interface 1232 to read from and write to one or more portable computer-readable tangible storage devices 1336, such as a CD-ROM, DVD, memory stick, magnetic tape, magnetic disk, optical disk or semiconductor storage device. Files 725 can be stored on one or more of the respective portable computer-readable tangible storage devices 1336, read via the respective R/W drive or interface 1232 and loaded into the respective computer-readable tangible storage devices 1230.

Each set of internal components 1200 also includes network adapters or interfaces 1236 such as a TCP/IP adapter cards, wireless Wi-Fi interface cards, or 3G or 4G wireless interface cards or other wired or wireless communication links. Files 725 can be downloaded to computing device 110, respectively, from an external computer via a network (for example, the Internet, a local area network or other, wide area network) and respective network adapters or interfaces 1236. From the network adapters or interfaces 1236, the files 725 in the communications node suspenders 705 are loaded into the respective computer-readable tangible storage devices 1230. The network may comprise copper wires, optical fibers, wireless transmission, routers, firewalls, switches, gateway computers and/or edge servers.

Each of the sets of external components 1300 can include a computer display monitor 1320, a keyboard 1330, and a computer mouse 1334. External components 1300 can also include touch screens, virtual keyboards, touch pads, pointing devices, and other human interface devices. Internal components 1200 also include device drivers 1240 to interface to computer display monitor 1320, keyboard 1330 and computer mouse 1334. The device drivers 1240, R/W drive or interface 1232 and network adapters or interfaces 1236 comprise hardware and software (stored in storage device 1230 and/or ROM 1224).

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, though the Internet using an Internet Service Provider).

Based on the foregoing, various embodiments been disclosed in accordance with the present invention. However, numerous modifications and substitutions can be made without deviating from the scope of the present invention. Therefore, the present invention has been disclosed by way of example and not limitation.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

The invention claimed is:

1. Communications suspenders, comprising:
   a first strap;
   a second strap;
   a third strap;
   an intermediate portion comprising a top end and a bottom end;
   wherein
      each of the first strap, the second strap, and the third strap comprise a first end and a second end;
      the first end of the first strap is coupled to the top end;
      the first end of the second strap is coupled to the top end proximate to the first end of the first strap;
      the first end of the third strap is coupled to the bottom end;
      at least one of the first strap, the second strap, the third strap, and the intermediate portion comprises an antenna element affixed thereto;
      the first strap or the second strap comprise a communications hub affixed thereto and comprising an antenna port;
      the antenna port conductively and demountably couples to a portable radio;
      the antenna port is conductively coupled to the antenna element and thereby allows the portable radio to communicate via the antenna element;

the second end of each of the first strap, the second strap, and the third strap comprises a demountable fastener that is configured to demountably couple to a pair of trousers;
the communications suspenders are configured to be worn on shoulders;
the antenna element comprises a conductive composition;
the conductive composition comprises a polymer and fully exfoliated single sheets of graphene; and
the graphene sheets are present in the polymer as a three-dimensional percolated network.

2. The communications suspenders of claim 1, wherein
at least one of the first strap, the second strap, the third strap, and the intermediate portion comprises an antenna attachment site;
the antenna attachment site
is conductively coupled to the antenna port; and
demountably couples to a demountable antenna element.

3. The communications suspenders of claim 2, wherein
the demountable antenna element comprises the conductive composition.

4. The communications suspenders of claim 3, wherein
the demountable antenna element and the antenna attachment site demountably engage each other when shifted in a common plane and thereby forms a selective, intermitting, and conductive coupling therebetween.

5. The communications suspenders of claim 4, wherein
at least one of the first strap, the second strap, the third strap, and the intermediate portion comprises a RF shielding material is positioned proximate to the antenna element or the antenna attachment site in a manner to reflect RF radiation that emanates from the antenna element or the antenna attachment site.

6. The communications suspenders of claim 4, wherein
the RF shielding material comprises one or more of a textile, a mesh, a coating, and a foam.

7. A communications suspenders, comprising:
a first strap;
a second strap;
a third strap;
an intermediate portion comprising a top end and a bottom end;
wherein
each of the first strap, the second strap, and the third strap comprise a first end and a second end;
the first end of the first strap is coupled to the top end;
the first end of the second strap is coupled to the top end proximate to the first end of the first strap;
the first end of the third strap is coupled to the bottom end;
at least one of the first strap, the second strap, the third strap, and the intermediate portion comprises an antenna element affixed thereto;
the first strap or the second strap comprise a communications hub affixed thereto and comprising an antenna port;
the antenna port conductively and demountably couples to a portable radio;
the antenna port is conductively coupled to the antenna element and thereby allows the portable radio to communicate via the antenna element;
the second end of each of the first strap, the second strap, and the third strap comprises a demountable fastener that is configured to demountably couple to a pair of trousers;
the communications suspenders are configured to be worn on shoulders;
the antenna element comprises a conductive composition;
the conductive composition comprises a polymer and fully exfoliated single sheets of graphene; and
the graphene sheets are present in the polymer as a three-dimensional percolated network.

8. The communications suspenders of claim 7, wherein
at least one of the first strap, the second strap, the third strap, and the intermediate portion comprises an antenna attachment site;
the antenna attachment site
is conductively coupled to the antenna port; and
demountably couples to a demountable antenna element.

9. The communications suspenders of claim 8, wherein
the demountable antenna element comprises the conductive composition.

10. The communications suspenders of claim 8, wherein
the demountable antenna element and the antenna attachment site demountably engage each other when shifted in a common plane and thereby forms a selective, intermitting, and conductive coupling therebetween.

11. The communications suspenders of claim 7, wherein
at least one of the first strap, the second strap, the third strap, and the intermediate portion comprises a RF shielding material is positioned proximate to the antenna element or the antenna attachment site in a manner to reflect RF radiation that emanates from the antenna element or the antenna attachment site.

12. The communications suspenders of claim 11, wherein
the RF shielding material comprises one or more of a textile, a mesh, a coating, and a foam.

13. Communications suspenders, comprising:
a first strap;
a second strap;
a third strap;
an intermediate portion comprising a top end and a bottom end;
wherein
each of the first strap, the second strap, and the third strap comprise a first end and a second end;
the first end of the first strap is coupled to the top end;
the first end of the second strap is coupled to the top end proximate to the first end of the first strap;
the first end of the third strap is coupled to the bottom end;
at least one of the first strap, the second strap, the third strap, and the intermediate portion comprises an antenna element affixed thereto;
the first strap or the second strap comprise a communications hub affixed thereto and comprising an antenna port;
the antenna port conductively and demountably couples to a portable radio;
the antenna port is conductively coupled to the antenna element and thereby allows the portable radio to communicate via the antenna element;
the second end of each of the first strap, the second strap, and the third strap comprises a demountable fastener that is configured to demountably couple to a pair of trousers;
the communications suspenders are configured to be worn on shoulders;

at least one of the first strap, the second strap, the third strap, and the intermediate portion comprises an antenna attachment site;

the antenna attachment site
- is conductively coupled to the antenna port;
- demountably couples to a demountable antenna element;

the antenna element comprises a conductive composition;

the conductive composition comprises a polymer and fully exfoliated single sheets of graphene; and the graphene sheets are present in the polymer as a three-dimensional percolated network.

14. The communications suspenders of claim 13, wherein the demountable antenna element comprises the conductive composition.

15. The communications suspenders of claim 13, wherein the demountable antenna element and the antenna attachment site demountably engage each other when shifted in a common plane and thereby forms a selective, intermitting, and conductive coupling therebetween.

16. The communications suspenders of claim 13, wherein at least one of the first strap, the second strap, the third strap, and the intermediate portion comprises a RF shielding material is positioned proximate to the antenna element or the antenna attachment site in a manner to reflect RF radiation that emanates from the antenna element or the antenna attachment site.

17. The communications suspenders of claim 16, wherein the RF shielding material comprises one or more of a textile, a mesh, a coating, and a foam.

* * * * *